United States Patent
Orsbon et al.

(10) Patent No.: US 7,303,832 B2
(45) Date of Patent: Dec. 4, 2007

(54) ELECTROCHEMICAL FUEL CELL COMPRISED OF A SERIES OF CONDUCTIVE COMPRESSION GASKETS AND METHOD OF MANUFACTURE

(75) Inventors: Wyatt B. Orsbon, Sacramento, CA (US); Rex A. Hodge, Sacramento, CA (US); Rolf R. Becker, Orangevale, CA (US)

(73) Assignee: SemGreen, L.P., Houston, TX (US)

( * ) Notice: Subject to any disclaimer, the term of this patent is extended or adjusted under 35 U.S.C. 154(b) by 152 days.

(21) Appl. No.: 10/435,366

(22) Filed: May 8, 2003

(65) Prior Publication Data
US 2004/0018412 A1 Jan. 29, 2004

Related U.S. Application Data

(60) Provisional application No. 60/379,523, filed on May 9, 2002.

(51) Int. Cl.
*H01M 8/04* (2006.01)
*H01M 8/10* (2006.01)
(52) U.S. Cl. .............................. 429/26; 429/36; 429/39
(58) Field of Classification Search .................. 429/36, 429/39, 26
See application file for complete search history.

(56) References Cited

U.S. PATENT DOCUMENTS

| | | | |
|---|---|---|---|
| 4,217,401 A * | 8/1980 | Pellegri et al. ................ | 429/39 |
| 5,110,693 A | 5/1992 | Friend et al. | |
| 5,176,966 A | 1/1993 | Epp et al. | |
| 5,284,718 A | 2/1994 | Chow et al. | |
| 5,300,370 A | 4/1994 | Washington et al. | |
| 5,464,700 A | 11/1995 | Steck et al. | |
| 5,521,018 A | 5/1996 | Wilkinson et al. | |
| 5,683,828 A | 11/1997 | Spear et al. | |
| 5,773,160 A | 6/1998 | Wilkinson et al. | |
| 5,804,326 A | 9/1998 | Chow et al. | |
| 5,863,673 A | 1/1999 | Campbell et al. | |
| 5,928,807 A | 7/1999 | Elias | |
| 5,976,726 A * | 11/1999 | Wilkinson et al. ............ | 429/35 |
| 6,001,502 A | 12/1999 | Walsh | |

(Continued)

OTHER PUBLICATIONS

Keith B. Prater, Solid Polymer Fuel Cell Developments at Ballard, Journal of Power Sources, 37 (1992), pp. 181-188, no month.

(Continued)

*Primary Examiner*—John S. Maples
(74) *Attorney, Agent, or Firm*—Audrey A. Millemann; Weintraub Genshlea et al.

(57) ABSTRACT

The invention includes a proton exchange membrane fuel cell (PEMFC) comprising at least one fuel cell assembly. The fuel cell assembly includes a membrane electrode assembly interposed between an anode separator and a cathode separator. The membrane electrode assembly comprises a proton exchange membrane interposed between an anode and a cathode, each electrode comprising an electrocatalyst. The anode and cathode separators contain the flow field features necessary to communicate the fuel and oxidant, respectively, to their respective electrodes. A heat transfer separator may be integrated into the fuel cell assembly. Each separator is made up of a series of conductive compression gaskets that distribute fuel, oxidant and heat transfer fluid throughout the fuel cell. Under mechanical load, the respective series of compression gaskets are consolidated into fuel cell separators with sufficient structural integrity to seal the PEMFC fluids.

18 Claims, 4 Drawing Sheets

U.S. PATENT DOCUMENTS

| | | | |
|---|---|---|---|
| 6,051,331 A * | 4/2000 | Spear et al. | 429/34 |
| 6,057,054 A | 5/2000 | Barton et al. | |
| 6,060,190 A | 5/2000 | Campbell et al. | |
| 6,074,773 A | 6/2000 | Wilkinson et al. | |
| 6,080,503 A | 6/2000 | Schmid et al. | |
| 6,103,077 A | 8/2000 | DeMarinis et al. | |
| 6,159,629 A | 12/2000 | Gibb et al. | |
| 6,350,538 B1 * | 2/2002 | Wilkinson et al. | 429/32 |

OTHER PUBLICATIONS

Shimshon Gottesfeld, The Polymer Electrolyte Fuel Cell: Materials . . . Source, http://education.lanl.gov/resources/H2/gottesfeld/education.html, 5 pages, no date.

* cited by examiner

ELECTROCHEMICAL FUEL CELL COMPRISED OF A SERIES OF CONDUCTIVE COMPRESSION GASKETS AND METHOD OF MANUFACTURE

CROSS-REFERENCE TO RELATED APPLICATIONS

This application claims the benefit of U.S. Provisional Application No. 60/379,523, filed on May 9, 2002.

BACKGROUND OF THE INVENTION

1. Field of the Invention

The present invention relates to electrochemical energy converters such as fuel cells or electrolysis cells. More particularly, it relates to Proton Exchange Membrane Fuel Cells (PEMFCs). The present fuel cell invention can be categorized further as relating to PEMFCs constructed, in part, of separators, each comprised of a respective series of conductive compression gaskets possessing inter-related fluid distribution channel and manifold features.

2. Description of the Prior Art

The class of electrochemical fuel cells comprising Proton Exchange Membranes (PEMs) convert the chemical energy of a hydrogen fuel and an oxidant into electrical energy, heat and water. Generically, PEM fuel cells employ Membrane Electrode Assemblies (MEAs) comprising a solid polymer electrolyte or ionomeric membrane interposed between an anode and a cathode, each electrode comprising electrocatalyst, typically Platinum (Pt). The electrocatalyst depositions define the fuel cell "active area" as the location in which the electrochemical reactions occur between the reactants and the Pt electrocatalyst. In turn, the MEA is interposed between an anode separator and a cathode separator; each separator comprising electrically conductive material and the physical means for fluid distribution of the reactants throughout the fuel cell.

As the need for sustainable energy supplies increases, PEM fuel cells are an appealing energy source because they convert universally abundant hydrogen and oxygen into energy in a practically noiseless electrochemical process that produces only electricity, heat and water. Yet, heretofore, technical and economical difficulties have abated the realization of PEM fuel cell technology as a viable commercial means for producing energy. Both the technical and economical difficulties originate from material issues concerning the materials employed within PEM fuel cell embodiments.

One of the most considerable material issues obstructing the commercial development and deployment of PEM fuel cells originates with the materials comprising the separators. Prior art PEM fuel cells typically comprise either metal or graphite separators. Ordinary metallic separators, fabricated from aluminum for example, will corrode and produce minute metal particulate that will react with the electrocatalyst and terminally diminish or arrest the electrochemical reactions. In order to prevent what is known as "catalyst poisoning," the PEM fuel cell industry plates the metallic separators with gold or exotic alloys, or employs metallic separators comprising expensive alternatives such as titanium. While the use of gold-plated, alloy-plated or exotic separators can prevent electrocatalyst poisoning, it is not cost effective for the large-scale commercial market.

Graphite separators are more cost effective than metallic separators because they are made from a less expensive material, and they are more chemically compatible with the electrochemical reaction but they present several technical complications concerning material integrity. Graphite separators typically are machined from monolithic slabs of graphite or sintered from loose graphite material. Machining graphite separators often requires tortuous tooling paths and complicated construction geometries that make the separators susceptible to technical problems during operation, such as crossover and overboard leakage, incongruous components and compromised structural integrity, etc. The sintering process possesses inherent variability that can translate into imperfections in sintered graphite separators. The loose graphite material is formed into a separator under thermal compression; this operation is susceptible to non-uniform compression and thermal gradation, which can translate into material imperfections and structural integrity problems, such as internal voids, surface defects and cracking. In addition, both machining and sintering are relatively expensive manufacturing methods and require long part-fabrication times. Moreover, graphite separators inherently exhibit lower thermal and electrical conductivity than metallic separators, thereby limiting the potential electrical generation of the fuel cell.

From a technical perspective, a significant shortcoming in the development of PEM fuel cells for commercial production is the inability to prevent reactant leakage between fuel cell components. Typically, PEM fuel cells are embodied as stratified apparatus comprising multiple planar components: the anode and cathode separators, the MEA and an elective cooling separator. The interfaces between the fuel cell components are susceptible to reactant leakage because the complementary surfaces are not completely mutually conformable. Crossover leaks (from one internal fluid stream to another) and overboard leaks (from interior fluid streams to the exterior environment) inhibit the performance, efficiency, power density, stoichiometry, etc. of the fuel cell system. Therefore, sealing materials, such as resilient gaskets are often incorporated into conventional fuel cell constructions. Gaskets are incorporated around the perimeter of the fuel cell in order to minimize or arrest over-board reactant leakage into the external environment. In addition, gaskets are employed to circumscribe the manifold and channel features and the active area in order to prevent the internal commixture of the reactants. However, the employment of gaskets within the fuel cell is a qualified solution because it also complicates several issues, such as the fuel cell design, construction, material compatibility and product life expectancy.

Moreover, fuel cell embodiments that employ graphite separators typically incorporate non-active cooling cells intermittently within the fuel cell stack rather than within individual fuel cells. This type of PEMFC construction is susceptible to thermal gradients, which are detrimental to the performance of the fuel cell stack and exacerbates water managements issues of dehydration and flooding.

These deliberations elucidate several specific difficulties inherent in PEM fuel cells that are specifically relevant to the present invention. Accordingly, it is evident that it is necessary to improve upon the PEM fuel cell design, the PEM fuel cell construction and the materials utilized in the embodiment in order to surmount the limiting difficulties of PEM fuel cell prior art.

SUMMARY OF THE INVENTION

Having thus illustrated the relevant limiting factors of the prior art of Proton Exchange Membrane Fuel Cells, it is among the objects of the present invention to provide a PEMFC that embodies an improved design that manifests satisfactory fluid sealing; that embodies and manifests improved fuel cell construction; and, that embodies and manifests improved fuel cell material compatibility. Additional objects and advantages of the present invention will be delineated in the following disclosure of the invention. Moreover, some objects and advantages will become evident to those skilled in the relevant arts through examination and extrapolation of the following disclosure, drawings and claims or through practice of the invention.

In accordance with the spirit and scope of the present invention, and in order to achieve the abovementioned objects that are generally illustrated herein, the present invention embodies a Proton Exchange Membrane Fuel Cell comprising fuel cell separators made up of respective series of multiple electrically conductive compression gaskets formed from cut sheets of conductive gasket material that is physically conformable and dimensionally compressive. Each series of conductive compression gaskets forms a specific PEMFC separator by means of sufficient sealing compression. Under compression, the respective series of conductive compression gaskets reciprocally conforming to one another, sealing voids between the gasket layers. Conjointly, the force of compression obdures the gaskets, collapsing voids within the gasket material, thereby creating a rigid, consolidated fuel cell separator. In addition, said gaskets possess interrelated channel and manifold features for the distribution of fluids within the fuel cell separator and stack.

Moreover, the present invention includes manufacturing methods that facilitate mass-production and low-cost fuel cell products. Rather than employing conventional methods of manufacturing fuel cell separators, such as machining and sintering, the conductive compression gaskets that comprise the fuel cell separators of the present invention can be formed by cutting, punching, stamping, etc. It should also be noted that the present invention is relevant to other similar apparatus that would benefit from the utility of the present invention, such as other classes of chemical and electrochemical energy converters, such as electrolysis cells.

BRIEF DESCRIPTION OF THE SEVERAL
VIEWS OF THE DRAWINGS

The disclosed invention will be elucidated with reference to the following detailed description of the invention in conjunction with the accompanying drawings in which.

DETAILED DISCLOSURE OF THE INVENTION

Figure 1:
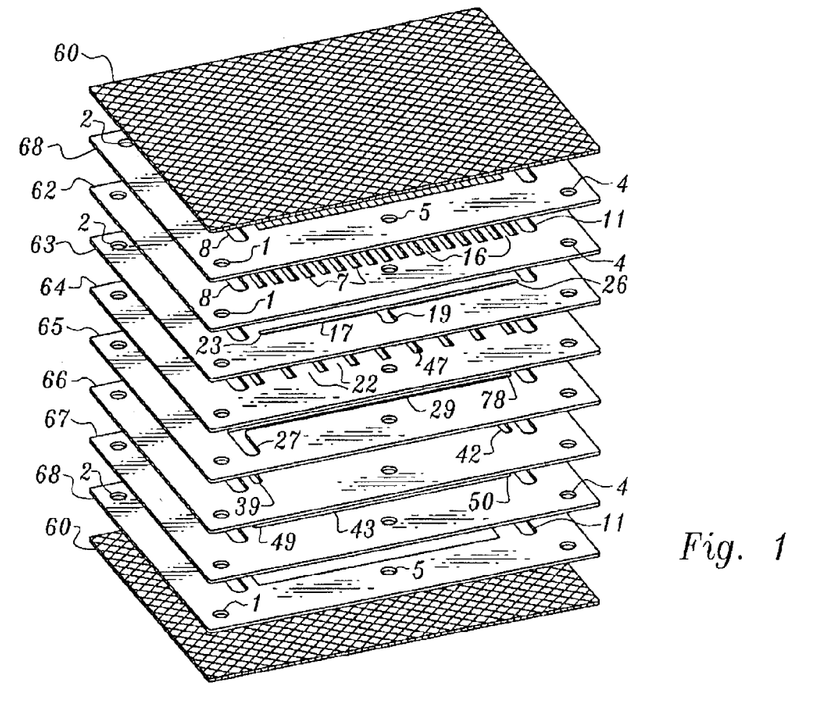
FIG. 1 is an exploded isometric view of a bipolar separator embodying this invention, which includes the HT separator, the chemically benign structural frame and the electrically conductive mesh.

To understand the disclosure of the various embodiments and modifications of embodiments that follows, a detailed explanation of the Figures and their respective components is helpful:

FIG. 1 shows the exploded isometric view of a consolidated bipolar separator that embodies an example of the disclosed invention, the various components which make up this view are:

The chemically benign meshes 60 are intended to interface with the MEA, which is not shown. The mesh is open enough, to allow the reactants to flow and diffuse from the channel features 7 and 43 to their respective electrodes within the MEA.

The chemically benign structural frame 68 comprising die-stamped through-features that allow the fuel cell fluids—fuel, oxidant and HTF—to pass through the structural frame. These features are the fuel manifold inlet 5; HTF manifolds, 8, and 11; and the oxidant manifold mediate inlet ducts 33 and 34 (see FIG. 6). Likewise, the structural frames circumscribe the active area of the MEA, leaving space to allow the reactants to interact with the electrodes, (not shown in the Figures).

The anode or fuel flow field gasket 62 comprising die-stamped fuel flow field channels 7; and the interstitial lands 16, between the channels.

The anode or fuel manifold flow field gasket 63 comprising die-stamped fuel manifold mediate inlet duct 19; fuel manifold inlet channel 17; and fuel manifold channel terminals 23 and 26. The anode manifold flow field gasket functions in conjunction with the anode channel flow field gasket in order to distribute the fuel from the fuel manifold inlet 5, across the anode (not shown).

The HTF channel flow field gasket 64 comprising die-stamped HTF flow field channels 21; HTF flow field channel ingress 47; and interstitial lands 22.

The HTF manifold flow field gasket 65 comprising die-stamped HTF manifold mediate inlet duct 27; HTF manifold inlet channel 29 and HTF manifold channel terminal 78. The HTF channel flow field gasket functions in conjunction with the HTF manifold flow field gasket in order to distribute the HTF from the HTF manifold inlet 8 (see FIG. 6), through the HTZ as defined by the HTF flow field channels 21, with egression through the HTF manifold outlet 10 (see FIG. 6), which is obscured in the illustration.

The cathode or oxidant manifold flow field gasket 66 comprising die-stamped oxidant manifold mediate inlet ducts 33 and 34 (see FIG. 6); oxidant manifold inlet channel 37 (see FIG. 6); oxidant manifold outlet channel 38 (see FIG. 6); and oxidant manifold channels terminals 39 (see FIG. 6) and 42.

Figure 7:
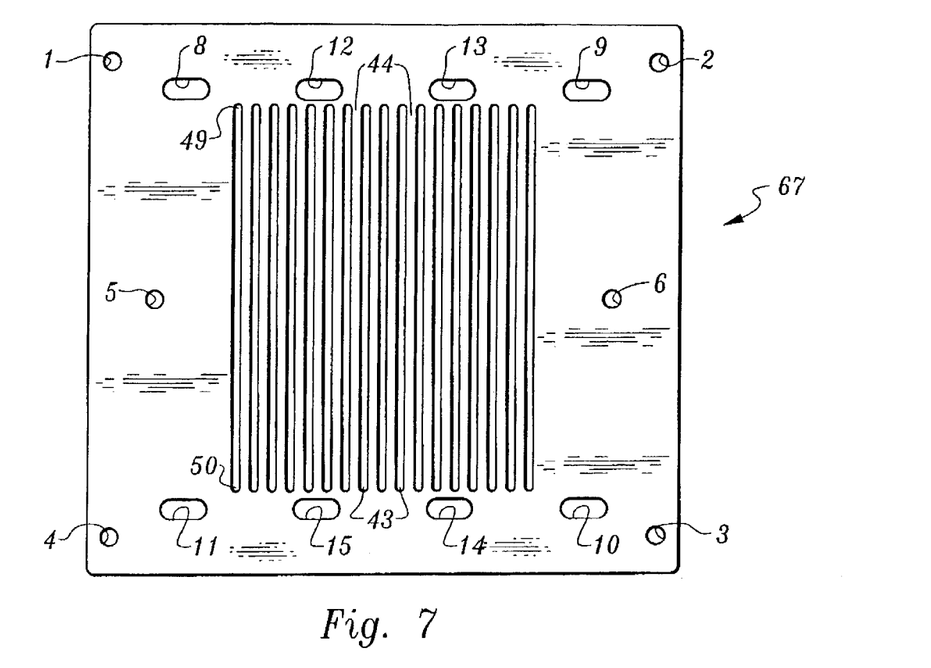
FIG. 7 is a detailed plan view of the reverse and obverse of the cathode channel flow field gasket.

The cathode or oxidant channel flow field gasket 67 comprising die-stamped oxidant flow field channels 43; oxidant flow field channel ingress 49; oxidant flow field channel egress 50; and interstitial lands 44 (see FIG. 7). The oxidant manifold flow field gasket functions in conjunction with the oxidant channel flow field gasket in order to distribute the oxidant from the oxidant manifold mediate inlet ducts 33 and 34, across the cathode (not shown).

Figure 2:
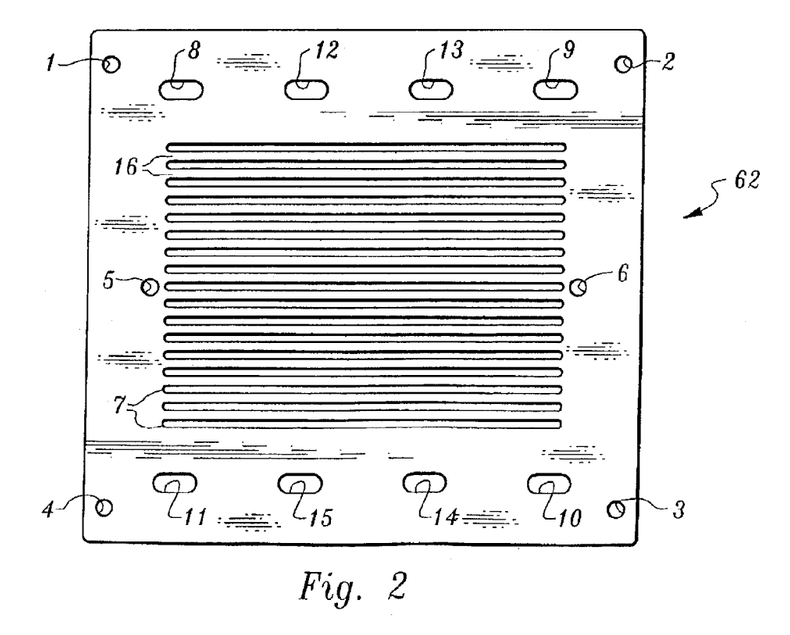
FIG. 2 is a detailed plan view of the obverse and reverse of the anode channel flow field gasket.

FIG. 2 is a detailed plan view of the obverse and reverse of the fuel or anode channel flow field gasket 62. The die-stamped anode channel flow field comprises a centrally located series of parallel channels 7, which superpose the anode active area (not shown in this illustration). The fuel enters the anode flow field channels, from the anode manifold inlet channel 17 (refer to FIG. 3), and flows across the anode active area in the direction of the anode manifold outlet 6. The fuel exits the anode channel flow field gasket into the anode manifold outlet channel 18 (refer to FIG. 3), contained within the anode manifold flow field gasket. The anode flow field channels are deliberately designed so that proper stoichiometric distribution of fuel in the anode active area is attained. The interstitial lands 16, function as internal support to maintain the dimensional stability of the channels under fluid pressure, as well as supporting the columnar loading force needed to seal the fuel cell.

Figure 3:
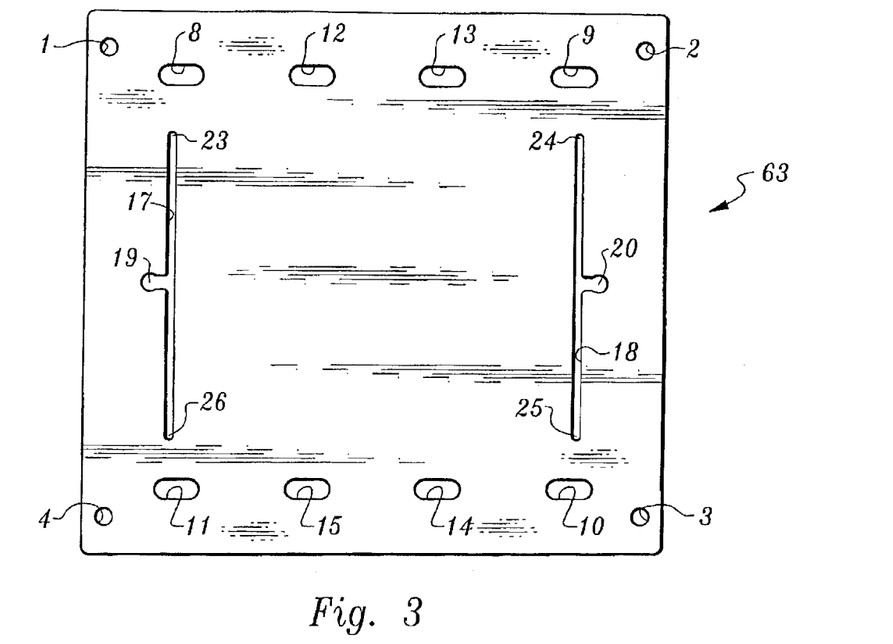
FIG. 3 is a detailed plan view of the obverse and reverse of the anode manifold flow field gasket.

FIG. 3 is a detailed plan view of the obverse and reverse of the fuel or anode manifold flow field gasket 63. The die-stamped anode manifold flow field gasket comprises one anode manifold mediate inlet duct 19, which communicates the fuel from the anode manifold inlet 5 (refer to FIG. 2), to the anode manifold inlet channel 17; thence, the fuel enters the anode channel flow field gasket 62, FIG. 2, as specified above. Upon egression from the anode flow field gasket, any unused fuel or impure gas is communicated to the anode manifold outlet channel 18, where the fuel enters the anode manifold mediate outlet duct 20, and ultimately exits the fuel cell via the anode manifold outlet 6 (refer to FIG. 2).

Figure 4:
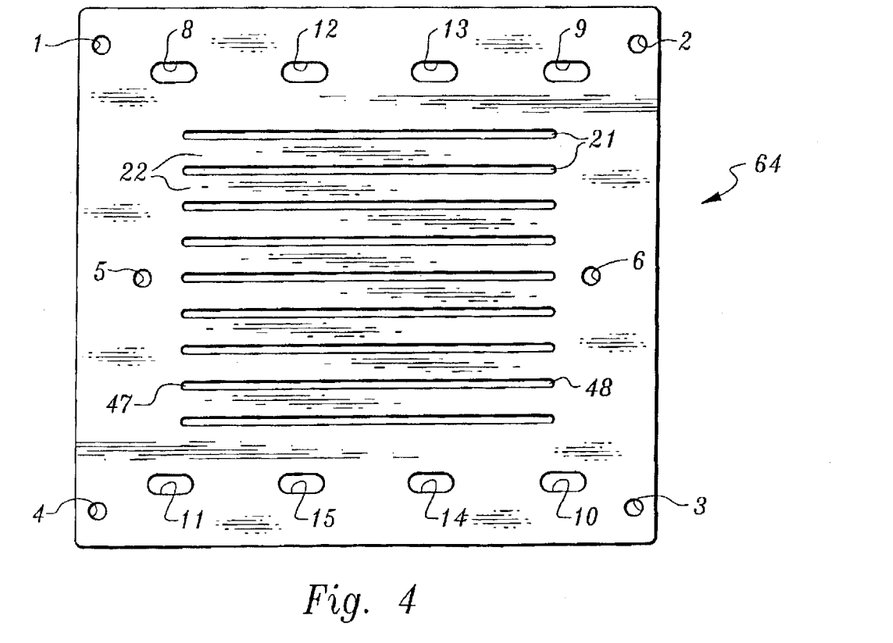
FIG. 4 is a detailed plan view of the obverse and reverse of the HTF channel flow field gasket.

FIG. 4 is a detailed plan view of the obverse and reverse of the HTF channel flow field gasket 64. The die-stamped HTF channel flow field gasket comprises a centrally located series of parallel channels 21, which define the HTZ, 47 to 48. The HTF enters the HTF flow field channels at the ingress 47, from the HTF manifold inlet channel 29 (refer to FIG. 5), and flows through the HTZ in the direction of the egress 48, transferring heat. The HTF exits the HTF channel flow field gasket into the HTF manifold outlet channel 30 (refer to FIG. 5). The HTF flow field channels are deliberately designed to maintain accurate thermal management within the fuel cell or fuel cell stack. The interstitial lands 22, function as internal support to maintain the dimensional stability of the channels under fluid pressure, as well as supporting the columnar loading force needed to seal the fuel cell. In addition, the interstitial lands of the HTF flow field gasket are deliberately designed to maintain a low thermal gradient within the HTZ and throughout the fuel cell or fuel cell stack. The HTZ is defined by the area affected by the HTF flow through the channels, that is, the substantially quadrilateral-shaped area around the channels. Moreover, it is within the spirit and scope of the disclosed fuel cell to embody said fuel cell utilizing countercurrent HTF flow in alternating fuel cells in a fuel cell stack in order to maximize the heat transfer within the fuel cell stack. In order to realize this embodiment, it is necessary to rotate the obverse face of the HTF manifold flow field gasket (See FIG. 5) to the reverse face when collating the gasket for consolidation. The transposition of the HTF manifold flow field gasket results in HTF flow in the opposite direction through the HTZ, of the HTF channel flow field gasket; i.e., the original egress 48, becomes the countercurrent ingress, and the original ingress 47, becomes the countercurrent egress.

Figure 5:
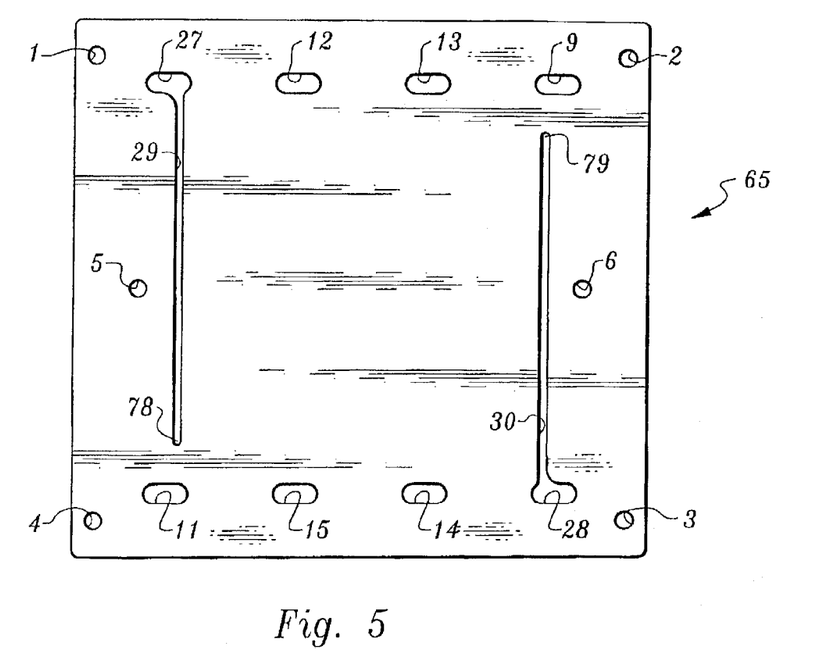
FIG. 5 is a detailed plan view of the reverse of the HTF manifold flow field gasket.

FIG. 5 is a detailed plan view of the reverse of the HTF manifold flow field gasket 65. The die-stamped HTF manifold flow field gasket comprises a HTF manifold mediate inlet duct 27, which communicates the HTF from the HTF manifold inlet 8 (refer to FIG. 2), to the HTF manifold inlet channel 29; thence, the HTF enters the HTF channel flow field gasket, FIG. 4, as specified above. Upon egression from the HTF flow field gasket, the HTF is communicated to the HTF manifold outlet channel 30, where the HTF enters the HTF manifold mediate outlet duct 28, and ultimately exits the fuel cell via the HTF manifold outlet 10 (refer to FIG. 2). As aforementioned, it is within the spirit and scope of the disclosed fuel cell to embody said fuel cell utilizing countercurrent HTF flow to maximize the heat transfer within the fuel cell stack. In order to realize this embodiment, it is necessary to rotate the obverse face of the HTF manifold flow field gasket to the reverse face (and vise-versa) when collating the gaskets for consolidation. The transposition of the HTF manifold flow field gasket results in the countercurrent HTF flow through the HTF channel flow field gasket as stated above. In addition, it causes opposite HTF flow through the HTF manifold flow field gasket, i.e., the HTF manifold mediate outlet duct 28, becomes the countercurrent HTF manifold mediate inlet duct; the HTF manifold outlet channel 30, becomes the countercurrent HTF manifold inlet channel; the HTF manifold inlet channel 29, becomes the countercurrent HTF manifold outlet channel; the HTF manifold mediate inlet duct 27, becomes the countercurrent HTF manifold mediate outlet duct.

Figure 6:
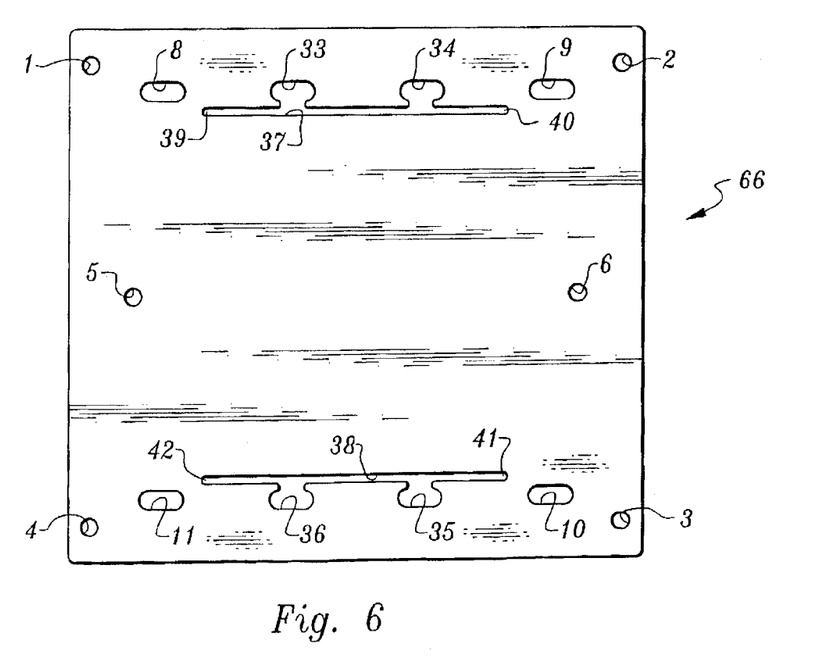
FIG. 6 is a detailed plan view of the reverse and obverse of the cathode manifold flow field gasket.

FIG. 6 is a detailed plan view of the reverse and obverse of the oxidant or cathode manifold flow field gasket 66. The die-stamped cathode manifold flow field gasket comprises a pair of cathode manifold mediate inlet ducts 33 and 34, which communicate the oxidant from the cathode manifold inlets 12 and 13 (refer to FIG. 2), to the cathode manifold inlet channel 37; thence, the oxidant enters the cathode channel flow field gasket, FIG. 7, 67 as specified below. Upon egression from the cathode flow field gasket, the oxidant is communicated to the cathode manifold outlet channel 38, where the oxidant enters the cathode manifold mediate outlet ducts 35 and 36, and ultimately exits the fuel cell via the oxidant manifold outlets 14 and 15 (refer to FIG. 2).

FIG. 7 is a detailed plan view of the reverse and obverse of the oxidant or cathode channel flow field gasket 67. The die-stamped cathode channel flow field gasket comprises a centrally located series of parallel channels 43, which superpose the cathode active area (not shown in this illustration). The oxidant enters the cathode flow field channels at the ingress 49, from the cathode manifold inlet channel 37 (refer to FIG. 6), and flows across the cathode active area in the direction of the egress 50. The oxidant exits the cathode manifold flow field gasket into the cathode manifold outlet channel 38 (refer to FIG. 6). The cathode flow field channels are deliberately designed so that proper stoichiometric distribution of oxidant in the cathode active area is attained. The interstitial lands 44, function as internal support to maintain the dimensional stability of the channels under fluid pressure, as well as supporting the columnar loading force needed to seal the fuel cell.

Figure 8:
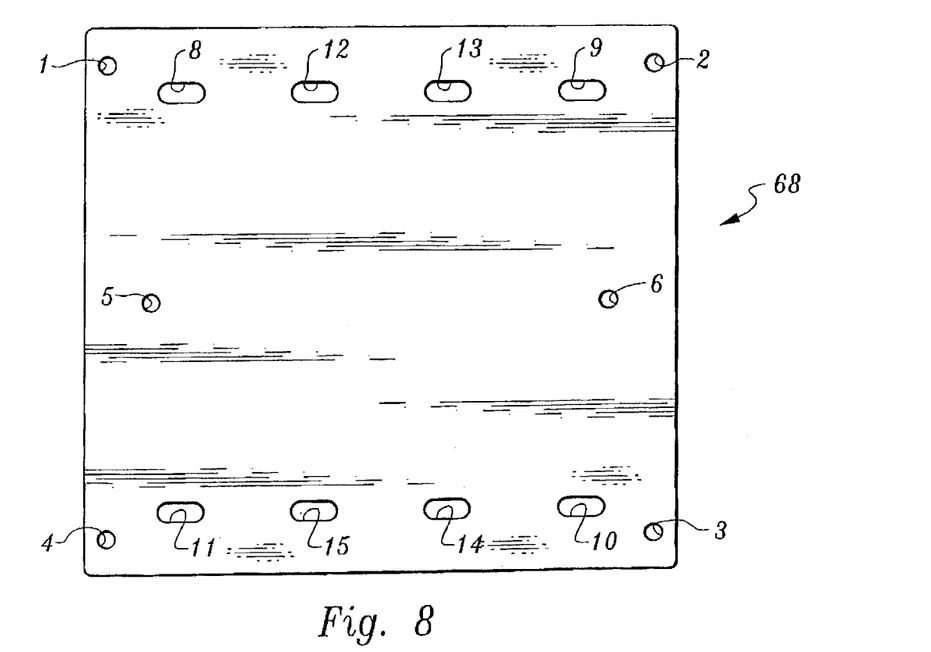
FIG. 8 is a detailed plan view of the obverse of the terminal or "blank" gasket.

FIG. 8 is a detailed plan view of the obverse and reverse of the terminal or "Blank" gasket 69. The die-stamped blank gasket comprises all of the manifolding that allows the fluids to flow through the PEMFC axially, such as: the anode manifold inlet 5; the anode manifold outlet 6; the standard HTF manifold inlet 8; the standard HTF manifold outlet 10; the countercurrent HTF manifold inlet 9; the countercurrent HTF manifold outlet 11; the cathode manifold inlets 12 and 13; cathode manifold outlets 14 and 15. The blank gasket also includes the alignment holes, features 1, 2, 3, 4.

Continuing to refer to the Figures, PEMFC stacks employing fuel cell embodiments of the present invention necessarily comprise a plurality of fuel cell assemblies. PEMFC assemblies are defined as comprising a Membrane Electrode Assembly (MEA) (not shown in Figures) interposed between 2 unipolar separators. In every pair, one unipolar separator is the anode (negative) separator (FIGS. 2 and 3 combined make up the anode separator) designed to distribute the fuel ($H_2$) to the anode; the other unipolar separator is the cathode (positive) separator (FIGS. 7 and 6 combined make up the cathode separator) designed to distribute the oxidant ($O_2$) to the cathode. The MEA consists of a solid polymer electrolyte, typically known as a Proton Exchange Membrane (PEM), interposed between the anode and cathode. Presently, the PEM typically is a perfluorosulfonate acid (PFSA) ionomer. The anode and cathode are electrocatalyst depositions in intimate contact with the membrane; generally, the electrodes comprise a noble metal such as platinum, palladium, rhodium, ruthenium, noble metal oxides, alloys containing said metals and/or mixtures thereof.

In practice, PEM fuel cell stacks generally are constructed of bipolar separators, which are the combination of an anode separator and a cathode separator, each facing outward (See FIG. 1). Almost exclusively, unipolar separators are positioned only at the terminals of a fuel cell stack, and bipolar separators are positioned proximally within the remainder of the fuel cell stack. In addition, it is a common technique to incorporate cooling separators or cooling cells within the fuel cell stack in order to alleviate thermal gradients or what are known as "hot spots" internal to the fuel cell stack. Embodiments of the present fuel cell invention may comprise, but are not limited by the inclusion of, a Heat Transfer (HT) separator (FIGS. 4 and 5 combined make up the HT separator) for the distribution of Heat Transfer Fluid (HTF) (not shown in Figures) to a HT Zone (HTZ) (substantially a quadrilateral shaped region defined by the channels of FIG. 4) within said HT separator affording thermal management of the fuel cell system. The Heat Transfer fluid can both "cool down" and "heat up" the fuel cell stack, by absorbing excess heat from the system or by transferring heat into the system.

Moreover, a Gas Diffusion Layer (GDL) (not shown in Figures) routinely is consolidated with the MEA at each electrode. The GDL is a thin porous material designed to diffuse the reactant gases evenly as they interact with their respective electrodes. The GDL material usually is a species of carbon paper coated with a slightly hydrophobic binder such as PTFE. The GDLs also facilitate the exportation of product-water from the anode and the transference of electrons from the cathode.

It should be noted that the present fuel cell invention is not dependent upon the type or performance of the membrane, electrocatalyst or GDL.

The principles of improved sealing capabilities of the present invention will be described herein, by means of example, as they pertain to PEMFC embodiments in general and specifically the fuel cell separators comprised therein. One of the fundamental objects of the present fuel cell invention is to prevent what are known as crossover leaks (from one internal fluid stream to another) and overboard leaks (from interior fluid streams to the exterior environment). As a substantial improvement over prior art, the present invention is based upon the compressing multiple sheets of physically conformable and dimensionally compressive material into a dimensionally stable, obdurate and consolidated fuel cell separator in order to improve sealing capabilities. Prior art fuel cell separators are rigid and inflexible, and thereby are susceptible to leakage at the component interfaces due to any existing material defects or manufacturing imperfections. As stated above, it is a common technique within PEM fuel cell prior art to incorporate resilient gaskets into these component interfaces in order to prevent leaks. Rather than increase the complication of PEMFC design by incorporating gaskets into the component interfaces, particularly the MEA-separator interface to arrest fluid leakage, the present invention embodies fuel cell separators that inherently function as gaskets themselves in order to eliminate potential points of failure or impaired operation due to the consequences of fluid leakage.

In addition to being physically conformable and dimensionally compressive for sealing and consolidation purposes, the gasket material also must be materially compatible, i.e., chemically benign so that the material does not poison the ionomeric membrane or the electrocatalyst. The material also must be capable of having the fluid distribution features cut through its 2 major planar surfaces using any number of processes, such as hand-cutting, shearing, simple or complex punch stamping, steel rule die stamping, male-female die stamping, laser or chemical ablation, etc. Therefore, there is a limited set of suitable materials from which to fabricate the conductive compression gaskets of the present invention. In one possible set of embodiments, the gasket material consists of electrically conductive elastomers or elastomer media comprising electrically conductive material, such as carbons, metals or other various conductive materials. The elastomer media allows the material to be physically conformable and dimensionally compressive; the carbons, metals or other suitable materials make the composition electrically conductive. Another set of gasket materials includes compressive thermoplastics impregnated with electrically conductive material much in the same manner as the elastomers. Yet another and more preferred gasket material is a specific class of graphite materials that comprises expanded graphite, exfoliated graphite and flexible graphite, which are employed as compression gasket material in other industries.

The present invention employs cut sheets of conductive compressive material as conductive compression gaskets, designed to produce a fluid-impermeable seal between each gasket in the respective separator series, thus forming a leak-free, consolidated separator. Within embodiments of the present invention, each type of separator—anode unipolar, cathode unipolar, bipolar and HT—is made up of a specific series of said conductive compression gaskets designed for that separator. Each gasket in the respective series is idiomorphic: possessing a specific configuration of fluid distribution channel and/or manifold features that dictate individual gasket functionality within the given separator. The idiomorphic features of every gasket are inter-related to the features of every other gasket in the respective series, the totality of which forms intra-communicating networks for the distribution of fluid(s)—fuel, oxidant and HTF—within the given fuel cell separator and fuel cell stack.

The conductive compression gaskets are designed to be integrated into a fuel cell separator in a specific sequence in a columnar configuration, such that the inter-related features align axially and form a network of channels and manifolds that distribute the fluids throughout the separator. Within bipolar separators embodying the present invention, there is a practical minimum of 3 gaskets and a more manageable working number of 4 or more. Preferably, the bipolar separators comprise 6 to 9 gaskets. Optimally, the preferred embodiments of bipolar separators comprise the following series of conductive compression gaskets or incorporate the requisite features therefrom:

A. Bipolar Example with HTF Separator:
1. Hydrogen channel flow field gasket 62 (See FIG. 1 for integrated view, FIG. 2 for isolated view);
2. Hydrogen manifold flow field gasket 63 (See FIG. 1 for integrated view, FIG. 3 for isolated view);
3. HTF channel flow field gasket 64 (See FIG. 1 for integrated view, FIG. 4 for isolated view);
4. HTF manifold flow field gasket 65 (See FIG. 1 for integrated view, FIG. 5 for isolated view);
5. Oxygen manifold flow field gasket 66 (See FIG. 1 for integrated view, FIG. 6 for isolated view); and
6. Oxygen channel flow field gasket 67 (See FIG. 1 for integrated view, FIG. 7 for isolated view).

The most basic embodiment of a PEMFC bipolar separator needs only to comprise the anodic features of the anode unipolar separator and the cathodic features of a cathode unipolar separator. As embodied within the present invention, this elementary bipolar separator design comprises the following series of gaskets or incorporates the requisite features therefrom:

B. Bipolar Example without HTF Separator:
1. Hydrogen channel flow field gasket 62 (See FIG. 1 for integrated view, FIG. 2 for isolated view);
2. Hydrogen manifold flow field gasket 63 (See FIG. 1 for integrated view, FIG. 3 for isolated view);
3. Oxygen manifold flow field gasket 66 (See FIG. 1 for integrated view, FIG. 6 for isolated view); and
4. Oxygen channel flow field gasket 67 (See FIG. 1 for integrated view, FIG. 7 for isolated view).

The cathode or positive terminal of the PEMFC stack contains the cathode unipolar separator. The cathode unipolar separator may comprise conductive compression gaskets identical to gaskets 5 and 6 from the bipolar separator delineated above or it may incorporate the requisite cathodic features therefrom. The cathode unipolar also may comprise a "blank" gasket that terminates the fuel cell stack and seals against the positive current collector. The preferred cathode unipolar separator comprises:

C. Cathode Unipolar:
1. Blank or terminal gasket 69 (See FIG. 8);
2. Oxygen manifold flow field gasket 66 (See FIG. 1 for integrated view, FIG. 6 for isolated view); and
3. Oxygen channel flow field gasket 67 (See FIG. 1 for integrated view, FIG. 7 for isolated view).

The anode or negative terminal of the PEMFC stack contains the anode unipolar separator. The anode unipolar separator may comprise conductive compression gaskets identical to gaskets 1 and 2 from the bipolar separator delineated above or it may incorporate the requisite anodic features therefrom. The anode unipolar also may comprise a "blank" gasket that terminates the fuel cell stack and seals against the negative current collector. The preferred anode unipolar separator comprises:

D. Anode Unipolar:
1. Hydrogen channel flow field gasket 62(See FIG. 1 for integrated view, FIG. 2 for isolated view);
2. Hydrogen manifold flow field gasket 63(See FIG. 1 for integrated view, FIG. 3 for isolated view); and
3. Blank or terminal gasket 69 (See FIG. 8).

The function of the features contained in the abovementioned gaskets will be demonstrated below in the detailed description of the example embodiments of the present fuel cell invention.

Using the bipolar separator (Example A) as the preferred example, under sealing compression, the multiple conductive compression gaskets in the series reciprocally conform to one another on a local level, sealing voids between the gasket layers of the separator. The compression produces a fluid-impermeable seal between each gasket layer, allowing the inter-related channel and manifold features to form leak-free intra-communicating systems for the distribution of fuel, oxidant and HTF throughout the bipolar separator and fuel cell stack. Sufficient sealing compression amalgamates the series of gaskets that compose the bipolar separator. Likewise, it also seals the separator-MEA interface and the perimeter of the fuel cell assembly. As the sealing force is increased, the gasket material itself compresses, becoming more rigid and obdurate throughout. The preferred graphite materials such as expanded, exfoliated and flexible graphites are porous materials, containing minute voids within the laminar structure of carbon flakes. These voids are compressed and the graphite gaskets become fluid-impermeable, inflexible and obdurate, exhibiting substantial structural integrity, dimensional stability and load-bearing ability, effectively creating a leak-free, consolidated bipolar separator.

When a given fuel cell separator of the present invention is subjected to mechanical loading, the conductive compression gaskets are displaced by the force, i.e., the gaskets compress. When the respective series of gaskets that comprise a given separator is in a state of compression, the fuel cell separator demonstrates sufficient structural integrity to contain the PEMFC fluids under substantial pressure; it demonstrates sufficient electrical and thermal conductivity to enable the operation of a high-performing Proton Exchange Membrane Fuel Cell; it demonstrates sufficient material obduracy to bear the compressive load necessary to seal the fuel cell stack; it demonstrates sufficient fluid impermeability in order to prevent fluid migration through the gasket material.

There are two methods of mechanical loading that are relevant to the discussion of the present invention: columnar loading and lateral load transmission. Columnar loading is achieved when the compressive force is continuously transmitted from one end of a fuel cell stack to the other, meaning that each piece of material transmits the force exerted upon it to the next piece of material in the direction of the force, and so on. When a given fuel cell separator is in a mechanically loaded state, where there are columns of continuous material from one end of the separator to the other, the force is exerted as column loading, and these columns of continuous gasket material demonstrate sufficient structural integrity, conductivity, material obduracy and fluid impermeability.

Within that same fuel cell separator, there are columns of discontinuous material, containing the discrete gaps that correspond to the fluid distribution channel and manifold features within the compressed series of gaskets. Because of these deliberate gaps between gasket layers, the pieces of gasket material do not transmit the mechanical load continuously through the column, resulting in regions of uncompressed material. However, the fundamental material properties are still maintained within the fuel cell separator via lateral load transmission of the given species of gasket material. Lateral load transmission is the descriptor of the transmission of force through the region of a characteristic non-zero angle, i.e., the compressive force that is exerted upon a piece of gasket material is transmitted, not only to the adjacent piece of material in the direction of force, but also to the oblique pieces of material that are situated around it. The characteristic angle is dependent in part on the modulus of elasticity, or stiffness, of the given gasket material, so that every species of gasket material will have a characteristic angle of lateral load transmission.

Measured at the corners or other defined boundaries of the feature (a channel feature or manifold, for example), 2 curvilinear rays propagating at the characteristic angle will intersect above the feature, and 2 curvilinear rays will intersect below the feature. Each set of curvilinear rays defines a critical region (more or less triangular in most cases) with the respective boundary line of the feature. These 2 critical regions, 1 above and 1 below the feature, are substantially curvilinear when the material properties of the gasket material are non-linear. The critical regions of material are mechanically unloaded and uncompressed; the gasket material outside of the critical regions are mechanically loaded and compressed just as the gasket material under column loading. Therefore, deficient structural integrity, conductivity, material obduracy and fluid impermeability will occur within the critical regions of the fuel cell separator.

This critical region should be taken into account when defining the geometry of the fuel cell separator so that the unloaded and uncompressed critical region does not interfere with the structural integrity, conductivity, material obduracy and fluid impermeability of the fuel cell separator, and ultimately the fuel cell stack. For example, the distribution features of one fluid type should not be connected to a distribution feature of another fluid type via a continuous volume of critical regions.

The preferable thickness of the gaskets ranges from 0.005 to 0.06 inches, with the most preferable thickness between 0.01 to 0.04 inches. Gaskets of 0.01 to 0.04 inches are optimum for lateral load transmission. Likewise, they are optimum for maintaining a sufficient balance between the dimensional stability of the consolidated bipolar separator, the material conformation at the local level of the gasket interfaces and the fluid flow through the distribution networks. The conductive compression gasket material cannot be exceedingly thin because the gaskets will be too conformal, potentially transmitting imperfections throughout the entire separator. In addition, gaskets that are too thin will not have adequate cross-sectional area within the channels and manifolds to permit proper fluid flow through the distribution network. Moreover, inadequate cross-sectional area will adversely affect lateral load transmission within the fuel cell separators. However, gaskets that are too thick will be inflexible and potentially can cause the series of gaskets to seal improperly or not at all. Moreover, an exceedingly thick gasket can allow too much fluid flow and thus affect various fuel cell parameters such as efficiency, power density, stoichiometry, thermal management, etc.

Within fuel cell separators, accurate passage geometry of the channels and manifolds enables proper fluid distribution, so that precise stoichiometric amounts of reactants are distributed to the anode and cathode, and sufficient Heat Transfer Fluid flows through the Heat Transfer Zone. As the series of compressive gaskets in the separators are consolidated, the channel and manifold features do not collapse or deform under compression despite the gaskets being made of conformal, compressive material. Instead, the features maintain their shape and proportionality as the walls of the features compress uniformly and become rigid and obdurate with the gasket material. Within embodiments incorporating graphite materials, such as those enumerated above, the flakes of graphite within the gasket material are compressed and the voids between the flakes evanesce. The gasket material thus becomes rigid and obdurate under compression. As the compression stabilizes the gasket material, the obdurate separator is capable of bearing the load requisite for sealing the fuel cell assemblies into a fuel cell stack.

The aforementioned graphite materials are porous and isotropic, establishing them as preferred materials for the conductive compression gaskets. When the conductive compression gasket is uncompressed, the material is physically conformable and dimensionally compressive due to the porous, laminar structure of the graphite flakes. As the gaskets are compressed, the material transitions to a more dimensionally stable, obdurate and load bearing state. Other substantially similar materials can be employed, insofar as they produce adequate conformability, compression, dimensional stability, obduracy and load bearing properties. Materials that exhibit these properties not only provide the present fuel cell invention with improved sealing and loading capabilities; they also allow the separators to be manufactured in unobvious and innovative methods. Such gasket materials utilized in the present invention are optimal for gasket manufacturing methods that cut through, shear or penetrate the gasket material, processes such as cutting, shearing, punching and stamping.

Normally, prior art graphite separators are manufactured utilizing machining or sintering methods. Both of these manufacturing methods involve material risks for the product, such as fracturing the separator during the machining process or irregular compression during sintering, for example. The present invention includes methods of production that obviate past manufacturing difficulties by utilizing a gasket material capable of withstanding the stress of production due to its conformable, compressive properties. Specifically, the conductive compression gasket material can be cut, punched, sheared, stamped, ablated, etc. and otherwise manipulated to form gaskets while the sheets of material are uncompressed and therefore more easily cut and handled.

One preferred method of manufacture consists of stamping sheets of graphite material, such as those enumerated above, in male-female die sets. The die set cuts the fluid flow channel and/or manifold features of the given gasket into the sheet material, thereby embodying an individual gasket of the present invention. This stamping process can be repeated for every gasket to be manufactured in the lot, each lot comprising a certain number of units of a given separator. (For example, one arbitrary lot may contain all the gaskets in the series needed to construct 10 bipolar separators, including the optional HT separator.) Male-female die stamping is a preferred mode of producing the conductive compression gaskets due to the quality, reliability and durability of the process. The male-female die set is a pair of sharp complementary dies that mate together to form a precisely stamped gasket. One die face contains a positive die of the given gasket; the other face contains the negative die of the same gasket. Because the uncompressed gasket material is soft, it is facilely sheared by the complementary blades of the male-female die.

Next, the individual conductive compression gaskets are inspected for quality control and loosely collated into the specific series of a given separator. Due to their durable nature, the gaskets can be rapidly handled, inspected, conditioned and otherwise made ready to be integrated into a fuel cell separator embodying the present invention. The conductive compression gaskets can be collated by several processes such as hand sorting methods, mechanical sorting methods, and automated sorting methods, for example.

In preferred embodiments, each gasket in the separator series is coated with a sealant that facilitates the alignment and integration of the gaskets during consolidation. The fuel cell sealant must be materially compatible in order to not damage the electrocatalyst or other components of the MEA;

nor can it compromise the structural integrity or material properties of the gasket material. In addition, the sealant composition should not be capable of short-circuiting the fuel cell stack. The optimum fuel cell sealant may comprise, but is not limited by, a water-soluble composition including a thermoplastic polymer or a similar component in order to facilitate the setting of the sealant interposed between the conductive compression gaskets. Other sealants may comprise suitable alternative solvents and polymers. However, a water-solvent thermoplastic composition is preferable because it will prevent the sealant from poisoning the fuel cell system with harsh volatile organic compounds (VOCs). Moreover, the curing process of a water-based sealant will not leave trapped VOCs within the fuel cell separators. The thermoplastic polymer or similar formulaic substitute will enable the liquid sealant to set and contribute to the creation of a liquid-impermeable seal between each gasket in the consolidated separator.

The gaskets should be coated with a thin yet effective layer of the water-soluble sealant, approximately 40 to 120 microns in thickness. The application of the aqueous sealant should be even and cover the surface of both sides of the individual gasket except the central region that coincides with active area of the MEA. The sealant can be applied to the conductive compression gaskets utilizing several techniques such as hand spraying methods, mechanical spraying methods, automated spraying methods dipping, and dry laminating, for example. It may be necessary for some fuel cell applications to mask the region of both sides of each gasket that correspond with the active area to prevent the sealant from acting as an electrical insulator and thereby increasing the resistance of the fuel cell or fuel cell stack. The effective coat of sealant allows the series of gaskets to be aligned and temporarily integrated into an uncompressed separator. Moreover, the sealant is intended to diffuse through and fill a portion of the voids in the porous graphite structure. This technique allows the sealant to coalesce with the gasket material and increase material integrity. Otherwise, the sealant would remain topical and could potentially delaminate from the conductive compression gaskets.

Within the preferred method of manufacture, the aligned and integrated series of gaskets is then compressed to consolidate the separator; the consolidation process also includes applying heat to the series of gaskets while under compression in order to set the thermoplastic component in the fuel cell sealant. In order to enable the consolidation process, the heat-press temperature should be based upon the parameters of the given thermoplastic polymer or other temperature-dependant components of the given sealant. Once the fuel cell separator is consolidated, it can be stored until the assembly of the fuel cell stack.

Auxiliary Fuel Cell Components

Structural Frame

Several auxiliary fuel cell components can be incorporated into alternative embodiments of the PEMFC subassembly: the first example of an auxiliary fuel cell component is a thin structural frame 68 designed to stiffen the bipolar or unipolar separators. Such a structural frame may be warranted in fuel cell applications that require additional durability or that exhibit severe mechanical conditions, such as vehicular or mobile applications. The structural frame preferably is a chemically benign plastic frame situated at the major planar faces of the separators; however, the structural frames potentially can be situated within the separator, interposed between gasket layers during separator fabrication. The structural frame circumscribes the active area of the fuel cell, leaving space for the separator face—and thereby the channels—to make contact with the MEA. The structural frame should incorporate the features necessary to allow the fluids to be distributed with the fuel cell and fuel cell stack. These various features can be cut into the structural frame in much the same manner as with the gaskets: cutting, punching, stamping, etc. The thickness of the structural frame material should range from 0.001 to 0.01 inches in order to allow proper contact between the separator and the MEA. If the structural frame is too thin, the frame will not provide enough structural support for the fuel cell; if the structural frame is too thick, the frame will create a spatial gap that can prevent proper contact between the separator and the MEA. Polyesters and other similar materials are a preferred set of materials suitable for the chemically benign structural frame.

Load-Activated Polymer Sealant

The structural frame is attached to the fuel cell separator utilizing a Load-Activated Polymer Sealant (LAPS) (not shown in Figures) specifically formulated for this purpose. The LAPS facilitates the seal between the chemically benign structural frame and the fuel cell separator much in the same manner as the above-mentioned sealant. However, the LAP sealant is load-activated, meaning that the compressive force required to seal the fuel cell activates the polymeric sealant, which then sets in situ within the fuel cell. This property allows the fuel cell assembly to be as compliant as possible during the construction process. The LAPS can be applied to the conductive compression gaskets or to the chemically benign structural frame utilizing several techniques such as hand spraying methods, mechanical spraying methods, automated spraying methods and dipping, for example.

Protective Mesh

Another auxiliary fuel cell component is a chemically benign mesh 60 designed to interpose the MEA/GDL and the channel features of the distal faces of the separators in order to support the MEA and prevent the PEM from being punctured by the carbon paper of the GDL. Pressure destabilization within the fuel cell system can cause a pressure differential across the PEM. The pressure differential can potentially cause the membrane to blow out into the distal channel features of the separator. As this occurs, the PEM often is punctured by the brittle strands of the carbon paper, thus causing an operational failure. The abovementioned mesh is designed to obviate such a scenario by supporting the PEM and preventing it from impinging upon the GDL and ultimately the channel features of the separators. The chemically benign mesh can be an embodied as a woven mesh or other physical means that satisfy the application. The mesh must incorporate an open weave in order to not hinder the flow and diffusion of the reactants at the electrodes, yet it must also be supportive enough to protect the MEA, particularly the PEM. In addition, the mesh material preferably is electrically conductive, in order to facilitate the transportation of electrons through the fuel cell stack.

EXAMPLES OF A GENERAL EMBODIMENT

Within the spirit and scope of the present Proton Exchange Membrane Fuel Cell invention, there are numerous preferred embodiments. The delineated embodiments that follow are examples of the preferred embodiments of the invention: they are intended to represent the spirit and scope of the present invention and to facilitate enablement.

Certain fuel cell components are necessary to embody an operational PEMFC assembly. The requisite fuel cell components include:
- A. An anode separator comprising: at least one fuel inlet 19; at least one means for fuel distribution from said fuel inlet to the anode 17 to 7. All of these features are shown on FIGS. 1, 2 and 3.
- B. A cathode separator comprising: at least one oxidant inlet 33 and 34; at least one means for oxidant distribution from said oxidant inlet to the cathode 37 to 43. All of these features are shown on FIGS. 1, 6 and 7.
- C. A Membrane Electrode Assembly interposed between said anode separator and said cathode separator (not shown in Figures). Said MEA comprises a Proton Exchange Membrane interposed between two electrodes comprising electrocatalyst; in addition, gas diffusion layers (GDLS) (not shown in Figures) are consolidated on each electrode of said MEA.

Wherein said anode and cathode separators comprise a specific series of electrically conductive compression gaskets possessing inter-related fluid distribution channel and manifold features that, once said separators are consolidated, compose said fluid manifolding and means of distribution.

EXAMPLES OF MODIFICATIONS TO THE GENERAL EMBODIMENT

The spirit and scope of the disclosed fuel cell invention encompasses numerous alternative embodiments and modifications, a set of indicative examples is delineated below:

1. A PEMFC embodying the present invention incorporating a Heat Transfer (HT)separator (See components 64, 65 of FIGS. 1, 4 and 5) comprising: at least one HT Fluid inlet 27; at least one means for HTF distribution, 29 to 47 to 21, from said HTF inlet to a HT Zone, area defined by channels 21, within the HT separator; at least one HTF outlet 28; at least one means for HTF distribution, 21 to 30, from said HTZ to said HTF outlet 28. Said HT separator may be incorporated into each fuel cell assembly within a fuel cell stack as a means of thermal management. Alternatively, HT separators can be incorporated at intervals throughout the fuel cell stack; for example, HT separators can be incorporated in every second or in every third fuel cell assembly within a fuel cell stack.
2. A PEMFC embodying the present invention incorporating a countercurrent Heat Transfer separator (not shown in Figures). As a corollary to the previous modified embodiment, said countercurrent HT separator embodies transposed distribution features of the standard HT separator (See FIGS. 1, 4 and 5) in order to produce HTF flow in the opposite direction of standard HTF flow. Counter current HTF separators can be realized simply by rotating FIG. 5 so that the obverse face becomes the reverse, thus transposing the positions of the HTF mediate inlet duct 27 and the HTF mediate outlet duct 28. This modification enables the HTF to flow in a serpentine manner through the PEMFC stack, allowing the portion of a fuel cell assembly that is least cooled or heated within itself to be situated next to the portion of an adjoining fuel cell assembly that is cooled or heated the greatest, alleviating detrimental thermal gradients.
3. A PEMFC embodying the present invention incorporating auxiliary components consisting of a chemically benign structural frame 68 (See FIG. 1) integrated with said cathode and anode separators to provide additional structural integrity, and/or an electrically conductive mesh 60 (See FIG. 1) to prevent the displacement of the membrane (not shown in Figures) into the distal channels of the separators 7 and 43.
4. A PEMFC embodying the present invention incorporating auxiliary components consisting of PEMFC separators integrated and consolidated with the aid of a fuel cell sealant (not shown in Figures) and/or consolidating the chemically benign structural frame 68 (See FIG. 1) with a Load-Activated Polymer Sealant (not shown in Figures).

Wherein said anode, cathode and Heat Transfer separators comprise a specific series of electrically conductive compression gaskets possessing inter-related fluid distribution channel and manifold features that, once said separators are consolidated, compose said fluid manifolding and means of distribution.

EXAMPLES OF PREFERRED EMBODIMENTS

Below is a set of examples of preferred embodiment of the present invention. The first comprises at least one fuel cell assembly comprising:

- A. An anode separator 62, 63 (See FIGS. 2 and 3) comprising: at least one fuel inlet 19; at least one means for fuel distribution from said fuel inlet to the anode 17 to 7; at least one fuel outlet 20; at least one means for fuel distribution 7 to 18 from said anode to said fuel outlet.
- B. A cathode separator 66, 67 (See FIGS. 7 and 6) comprising: at least one oxidant inlet 33 and 34; at least one means for oxidant distribution 37 to 43 from said oxidant inlet to the cathode; at least one oxidant outlet 35 and 36; at least one means for oxidant distribution 43 to 38 from said cathode to said oxidant outlet.
- C. A Membrane Electrode Assembly (not shown in Figures) interposed between said anode separator and said cathode separator. Said MEA comprises a Proton Exchange Membrane interposed between two electrodes comprising electrocatalyst; in addition, GDLs (not Shown in Figures) are consolidated on each electrode of said MEA.
- D. A Heat Transfer separator 64, 65 (See FIGS. 4 and 5) comprising: at least one HT Fluid inlet 27; at least one means for HTF distribution, 29 to 21, from said HTF inlet to a HT Zone, area defined by channels 21, within the HT separator; at least one HTF outlet 28; at least one means for HTF distribution, 21 to 30, from said HTZ to said HTF outlet.
- E. Auxiliary fuel cell components consisting of a chemically benign structural frame 68 (See FIG. 1) integrated with said cathode and anode separators to provide column-loading integrity and an electrically conductive mesh 60 to prevent the displacement of the membrane (not shown in Figures) into the distal channels of the separators 7 and 43.

Wherein said anode, cathode and Heat Transfer separators comprise a specific series of electrically conductive compression gaskets possessing inter-related fluid distribution channel and manifold features that, once said separators are consolidated, compose said fluid manifolding and means of distribution.

Another example of embodiment of the present invention comprises at least one fuel cell assembly comprising:

- A. An anode separator 62, 63 (See FIGS. 2 and 3) comprising: at least one fuel inlet 19; at least one means for fuel distribution from said fuel inlet to the anode 17 to 7; at least one fuel outlet 20; at least one means for fuel distribution 7 to 18 from said anode to said fuel outlet.
B. A cathode separator 66, 67 (See FIGS. 7 and 6) comprising: at least one oxidant inlet 33 and 34; at least one means for oxidant distribution 37 to 43 from said oxidant inlet to the cathode; at least one oxidant outlet 35 and 36; at least one means for oxidant distribution 43 to 38 from said cathode to said oxidant outlet.
C. A Membrane Electrode Assembly (not shown in Figures) interposed between said anode separator and said cathode separator. Said MEA comprises a Proton Exchange Membrane interposed between two electrodes comprising electrocatalyst; in addition, GDLs (not Shown in Figures) are consolidated on each electrode of said MEA.
D. A Heat Transfer separator 64, 65 (See FIGS. 4 and 5) comprising: at least one HT Fluid inlet 27; at least one means for HTF distribution, 29 to 21, from said HTF inlet to a HT Zone, area defined by channels 21, within the HT separator; at least one HTF outlet 28; at least one means for HTF distribution, 21 to 30, from said HTZ to said HTF outlet.

Wherein said anode, cathode and Heat Transfer separators comprise a specific series of electrically conductive compression gaskets possessing inter-related fluid distribution channel and manifold features that, once said separators are consolidated, compose said fluid manifolding and means of distribution.

A third example embodiment of the present invention comprises at least one fuel cell assembly comprising:
A. An anode separator 62, 63 (See FIGS. 2 and 3) comprising: at least one fuel inlet 19; at least one means for fuel distribution from said fuel inlet to the anode 17 to 7; at least one fuel outlet 20; at least one means for fuel distribution 7 to 18 from said anode to said fuel outlet.
B. A cathode separator 66, 67 (See FIGS. 7 and 6) comprising: at least one oxidant inlet 33 and 34; at least one means for oxidant distribution 37 to 43 from said oxidant inlet to the cathode; at least one oxidant outlet 35 and 36; at least one means for oxidant distribution 43 to 38 from said cathode to said oxidant outlet.
C. A Membrane Electrode Assembly (not shown in Figures) interposed between said anode separator and said cathode separator. Said MEA comprises a Proton Exchange Membrane interposed between two electrodes comprising electrocatalyst; in addition, GDLs (not Shown in Figures) are consolidated on each electrode of said MEA.
D. A PEMFC stack embodying a Heat Transfer system that incorporates alternating standard (See FIGS. 4 and 5) and countercurrent HT separators 64, 65 (See Modification Example 1), both HT separators comprising: at least one HT Fluid inlet: standard 27, countercurrent 9; at least one means for HTF distribution from said HTF inlets to a HT Zones within the HT separators: standard 29 to 21, countercurrent 30 to 21; at least one HTF outlet: standard 28, countercurrent 11; at least one means for HTF distribution from said HTZs to said HTF outlets: standard 21 to 30, countercurrent 21 to 29.
E. Auxiliary fuel cell components consisting of a chemically benign structural frame 68(See FIG. 1) integrated with said cathode and anode separators to provide column-loading integrity and an electrically conductive mesh 60 (See FIG. 1) to prevent the displacement of the membrane (not shown in Figures) into the distal channels of the separators 7 and 43.

Wherein said anode, cathode and Heat Transfer separators comprise a specific series of electrically conductive compression gaskets possessing inter-related fluid distribution channel and manifold features that, once said separators are consolidated, compose said fluid manifolding and means of distribution.

It is imperative to note that the examples of alternative embodiments and modifications of the disclosed fuel cell invention delineated above are representative and do not encompass the exhausted totality of the modifications or embodiments contained within the scope and spirit of the present invention. Some additional alternative embodiments and modifications will become evident to those skilled in the relevant arts through examining and extrapolating from the disclosure or through practice of the invention.

The invention claimed is:

1. An electrochemical fuel cell stack comprising at least one fuel cell assembly, wherein said fuel cell assembly comprises:
   A. An anode separator comprising at least one fuel inlet and at least one means for fuel distribution from said fuel inlet to the anode;
   B. A cathode separator comprising at least one oxidant inlet and at least one means for oxidant distribution from said oxidant inlet to the cathode;
   C. A heat transfer separator interposed between said anode and cathode separators comprising at least one heat transfer fluid inlet, at least one means for heat transfer fluid distribution from said heat transfer fluid inlet to a heat transfer zone within the heat transfer separator, at least one heat transfer fluid outlet and at least one means for beat transfer fluid distribution from said heat transfer zone to said heat transfer fluid outlet; and
   D. A membrane electrode assembly comprising a proton exchange membrane interposed between said anode and said cathode, said membrane electrode assembly interposed between said anode separator and said cathode separator; wherein said anode, catnode, and heat transfer separators each comprise a specific series of electrically conductive compression gaskets possessing inter-related fluid distribution channel and manifold features that, once said separators are consolidated, compose said fluid manifolding and means of distribution.

2. The electrochemical fuel cell stack of claim 1, wherein the mode of embodiment of said fuel cell assembly further comprises countercurrent heat transfer separators to enable countercurrent heat transfer fluid flow within said fuel cell stack.

3. The electrochemical fuel cell stack of claim 1, wherein said fuel cell assembly further comprises a chemically benign structural frame, either externally situated on the distal face(s) of a given fuel cell separator or internally situated within a given fuel cell separator.

4. The electrochemical fuel cell stack of claim 3, wherein said chemically benign structural frame is comprised of ester and polyester resins.

5. The electrochemical fuel cell stack of claim 1, wherein said fuel cell assembly further comprises an electrically conductive mesh to prevent the displacement of the membrane into said fluid manifolding and distribution means.

6. The electrochemical fuel cell stack of claim 1, wherein said conductive compression gaskets are comprised of a material selected from the group consisting of electrically conductive elastomers, electrically conductive elastomer media, electrically conductive compressive thermoplastic media, graphite, expanded graphite, exfoliated graphite and flexible graphite.

7. The electrochemical fuel cell stack of claim 1, wherein said fuel cell assembly additionally comprises a chemically benign sealant.

8. The electrochemical fuel cell stack of claim 7, wherein said sealant is a water-based polymer emulsion.

9. The electrochemical fuel cell stack of claim 7, wherein said sealant diffuses and coalesces with the conductive compression gasket material to augment sealing.

10. The electrochemical fuel cell stack of claim 1, wherein said fuel cell assembly further comprises a load-activated polymer sealant.

11. The electrochemical fuel cell stack of claim 10, wherein said load-activated polymer sealant further comprises a thermoplastic component enabling a thermal cycle that facilitates repeated sealing of said fuel cell assembly components.

12. The electrochemical fuel cell stack of claim 10, wherein said load-activated polymer sealant is applied to said electrically conductive compression gaskets by a process which comprises a step involving either hand spraying, mechanical spraying, automated spraying, dipping, screen printing, or dry-laminating.

13. The electrochemical fuel cell of claim 1, wherein said electrochemical fuel cell is manufactured by a process comprising the step of forming said electrically conductive compression gaskets from electrically conductive compressive material by means of cutting, shearing, punching, ablating, male-female die cutting, and/or stamping.

14. The process of claim 13, wherein said step of forming said gaskets further comprises imparting features into said gaskets, wherein said features are for the purpose of providing fluid distribution through said gaskets.

15. The electrochemical fuel cell of claim 1, wherein said electrochemical fuel cell is manufactured by a process which comprises the steps of:

A. treating said electrically conductive compression gaskets with a chemically benign sealant, by means of a process that may be executed by such methods as hand spraying, mechanical spraying, automated spraying, dipping, screen printing or dry-laminating;

B. collating said electrically conductive compression gaskets into said specific series intended to embody the desired fuel cell separator by means of a process that may be executed by such methods as hand sorting, mechanical sorting or automated sorting; and C. sealing said sealant-treated electrically conductive compression gaskets together into a fuel cell separator by means of thermal compression.

16. The electrochemical fuel cell of claim 3, wherein said electrochemical fuel cell is manufactured by a process comprising the step of treating said chemically benign structural frame with a load-activated polymer sealant.

17. The electrochemical fuel cell of claim 1, wherein said electrochemical fuel cell is manufactured by a process comprising the step of compressing said electrically conductive compression gaskets under a mechanical load into a state wherein said electrically conductive compression gaskets effect a fuel cell separator that maintains sufficient structural integrity, electrical and thermal conductivity, material obduracy, and fluid impermeability.

18. The electrochemical fuel cell of claim 1, wherein said electrochemical fuel cell is designed in part by obviating a critical region of lateral load transmission of a given species of electrically conductive compression gasket material, whereby the fuel cell separator and fuel cell stack demonstrate sufficient structural integrity, electrical and thermal conductivity, material obduracy, and fluid impermeability.

* * * * *